United States Patent [19]
Pringle

[11] 3,952,841
[45] Apr. 27, 1976

[54] DISC BRAKE WEAR TAKE-UP
[75] Inventor: William L. Pringle, Grosse Pointe Shores, Mich.
[73] Assignee: United States Steel Corporation, Pittsburgh, Pa.
[22] Filed: Jan. 30, 1975
[21] Appl. No.: 545,622

Related U.S. Application Data
[63] Continuation-in-part of Ser. No. 410,701, Oct. 29, 1973, abandoned.

[52] U.S. Cl............................ 188/71.8; 188/72.3; 188/196 P
[51] Int. Cl.² ........................................ F16D 65/54
[58] Field of Search.............. 188/71.7, 72.3, 71.8, 188/79.5 GE, 196 P; 192/111 A

[56] References Cited
UNITED STATES PATENTS

| | | | |
|---|---|---|---|
| 2,984,319 | 5/1961 | Butler | 192/111 A |
| 3,064,768 | 11/1962 | Dotto | 188/71.8 |
| 3,243,017 | 3/1966 | Kleinstuck | 188/72.3 |
| 3,338,352 | 8/1967 | Guilhamat | 188/196 P |
| 3,722,637 | 3/1973 | Kershner | 188/71.8 |
| 3,756,353 | 9/1973 | Bombassei et al. | 188/72.3 |
| 3,788,429 | 1/1974 | Brooks et al. | 188/71.8 |

FOREIGN PATENTS OR APPLICATIONS

| | | | |
|---|---|---|---|
| 1,227,387 | 10/1961 | France | 188/196 P |
| 1,332,804 | 6/1963 | France | 188/71.8 |
| 1,087,412 | 8/1960 | Germany | 188/196 P |
| 1,189,811 | 3/1965 | Germany | 188/71.8 |

Primary Examiner—Trygve M. Blix
Assistant Examiner—Edward R. Kazenske
Attorney, Agent, or Firm—McGlynn and Milton

[57] ABSTRACT

A brake assembly having a friction disc mounted on a rotatable wheel, a friction element selectively movable into frictional engagement with the friction disc to apply a braking force, an actuator for moving the friction element into engagement with the friction disc, and biasing springs for retracting the friction element from such engagement. The actuator includes an open-ended hollow piston member and a cylinder housing slidably supporting the piston member. A shaft-like member is removably connected to the housing and extends into the cavity and the open end of the piston member to a distal end. The piston has a recess extending thereinto from the open rear end to define a first shoulder. A gripping member engages the shaft-like member for moving along the shaft-like member only in the direction toward the distal end of the shaft-like member. The piston also has a groove extending inwardly from the recess and axially spaced from the first shoulder. A retaining ring is removably disposed in the groove to provide a second shoulder for defining a channel between the shoulders. The gripping member includes a support portion disposed in the channel for movement between the shoulders. Thus, the gripping member may move along the shaft-like member to compensate for wear of the friction element, yet the friction element is allowed to retract out of engagement with the friction disc as the support portion of the gripping member moves axially in the channel between the first and second shoulders and the components may be easily assembled and disassembled.

5 Claims, 3 Drawing Figures

DISC BRAKE WEAR TAKE-UP

This application is a continuation-in-part of application Ser. No. 410,701 filed Oct. 29, 1973, now abandoned.

This invention relates to a brake assembly for a vehicle wheel and particularly to a wear take-up device which is also adapted to prevent excessive residual drag between the friction elements.

Brake assemblies of the type referred to generally include a friction disc, or the like, which is mounted on a vehicle wheel for rotation therewith. The friction disc provides a surface which is frictionally engaged by one or more friction elements, such as brake pads or the like, to apply a braking force thereto and thereby reducing the rotational velocity of the wheel. The friction elements are selectively moved into frictional engagement with the friction disc by means of an actuator which normally comprises a hydraulically operated piston. Hydraulic pressure is supplied to the piston through a conventional vehicle brake system including the normal master cylinder and brake pedal.

One problem which has been encountered with systems of this general description is that as wear occurs and the thickness of the friction element or pad diminishes, the distance which the piston must travel to bring the friction element into engagement with the friction disc increases. This causes lag in the system and is evidenced by excessive brake pedal travel before a braking force is applied. In order to alleviate this problem, wear take-up devices have been designed and incorporated into the brake assembly. Generally, these wear take-up devices permit the hydraulically actuated piston to move out of its cylinder housing, but prevent the piston from returning. Therefore, as wear occurs, the position of the piston within the cylinder housing moves outwardly so that the piston is always in engaging proximity to the friction element.

Known wear take-up devices have other disadvantages. Since these devices prevent retraction of the piston into the cylinder housing, the friction element oftentimes remains in frictional engagement with the friction disc, thereby causing excessive wear to both members. In other words, after the braking force has apparently been released, a residual force remains which creates unwanted drag. Devices of this general description are shown in U.S. Pat. Nos. 2,384,297 and 2,536,269. Further, some devices cannot be easily disassembled for repair purposes. An example of such is shown in U.S. Pat. No. 3,339,683.

It is, therefore, one of the primary purposes of this invention to provide an easily assembled and disassembled actuator incorporating a wear take-up device which avoids the drag problem by permitting the piston to retract a predetermined distance after actuation of the brake assembly to prevent excessive residual engagement between the friction element and the friction disc. Accordingly, the wear take-up device of the instant invention is provided with a shaft-like member removably connected to a housing with the connection means accessible from the exterior thereof and extending into an open-ended piston slidably disposed in the housing. The piston has a recess extending there-into from the open rear end to define a first shoulder. A gripping member engages the shaft-like member for moving along the shaft-like member only in the direction toward the distal end of the shaft-like member.

The piston also has a groove extending inwardly from the recess and axially spaced from the first shoulder. A retaining ring is removably disposed in the groove to provide a second shoulder for defining a channel between the shoulders. The gripping member includes a support portion disposed in the channel for movement between the shoulders. Thus, the gripping member may move along the shaft-like member to compensate for wear of the friction element, yet the friction element is allowed to retract out of engagement with the friction disc as the support portion of the gripping member moves axially in the channel between the first and second shoulders and the components may be easily assembled and disassembled.

Other features of the instant invention will be readily appreciated as the same becomes better understood by reference to the following detailed description when considered in connection with the accompanying drawings wherein.

Figure 1:
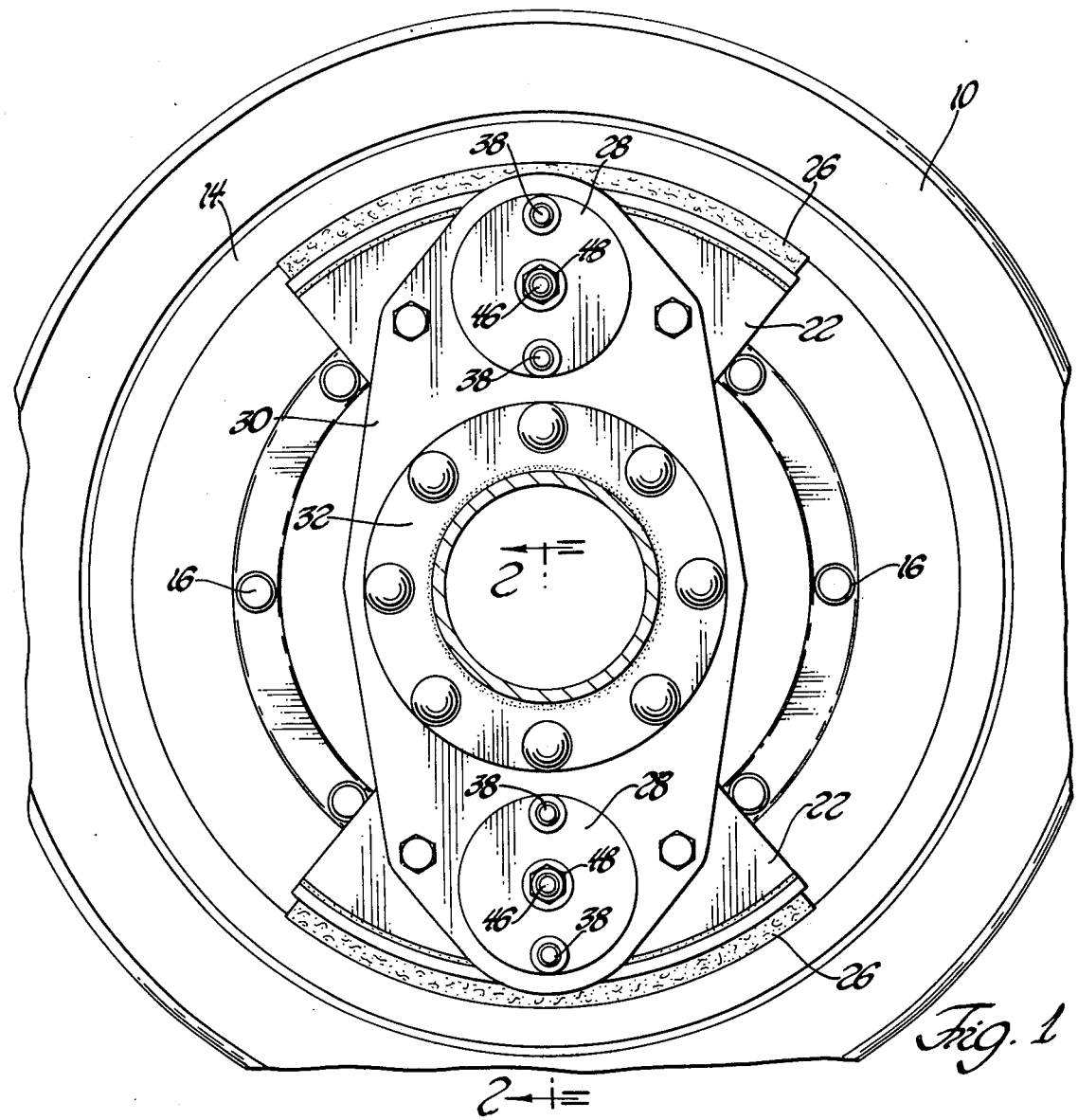
FIG. 1 is a front elevational view of a brake assembly constructed in accordance with the instant invention.
Figure 2:
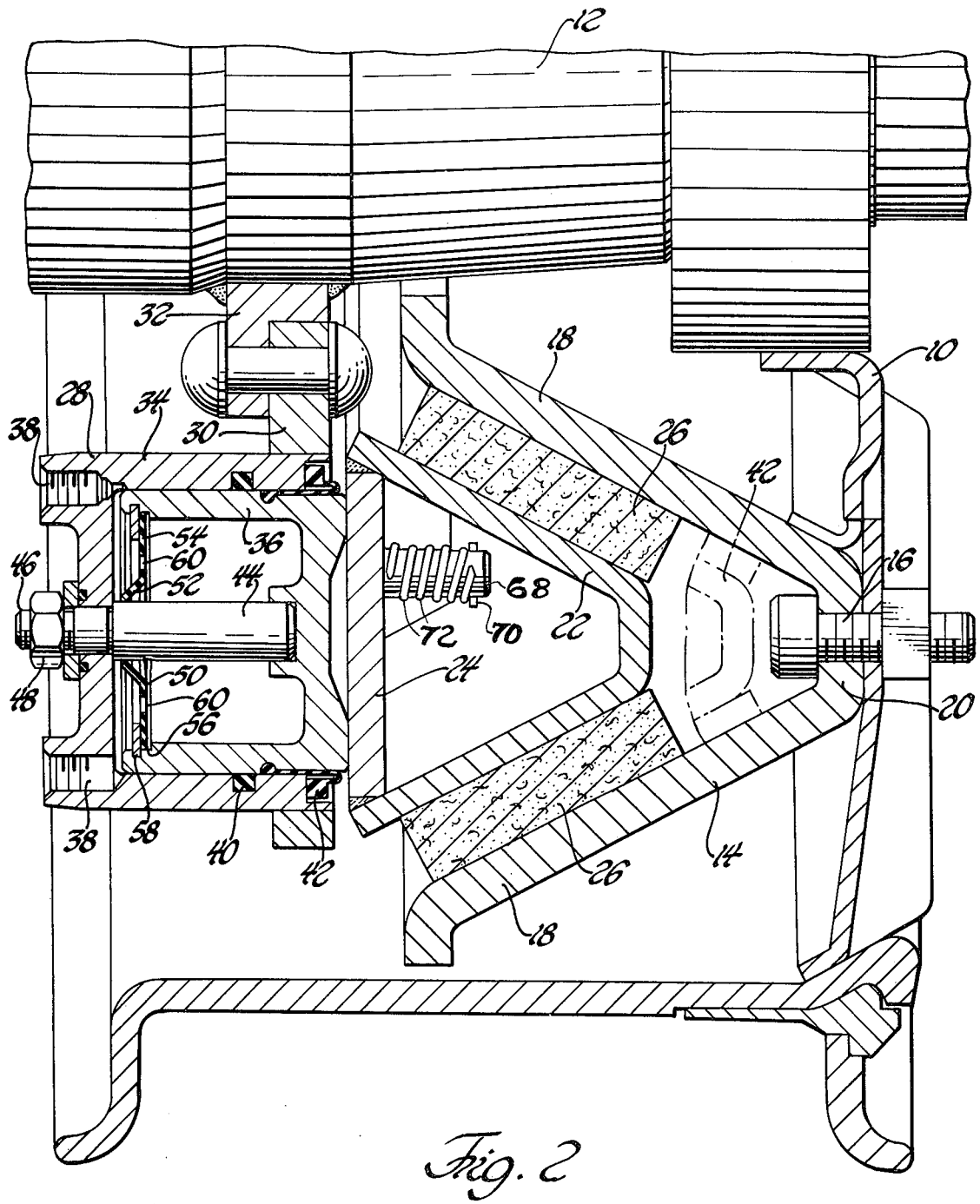
FIG. 2 is a partial cross-sectional view taken generally along line 2—2 of FIG. 1.

Referring more particularly to the drawings, a vehicle wheel 10 is shown rotatably mounted on an axle 12. Mounted for rotation with the wheel is a friction disc 14 which is secured thereto by means of a plurality of bolts 16. The friction disc 14 is of a V-groove configuration in that it includes two diverging side walls 18 joined at their convergent ends by a connecting wall 20. The interior surfaces of the friction disc 14 present a friction surface for engagement by a wedge-shaped friction element 22. The friction element 22 includes a support member 24 which is hollow and trapezoidally shaped in transverse cross-section, as best seen in FIG. 2. The support member 24 supports a friction pad 26 on each of its nonparallel diverging sides. As shown in FIG. 1, two friction elements 22 are employed and are disposed at diametrically opposite positions on the periphery of the friction disc. The friction elements 22 are also arcuately shaped to correspond to the curvature of the friction disc 14.

The friction elements 22 are moved into frictional enengagement with the friction disc 14 by means of a pair of substantially identical actuators 28. The actuators are mounted in a plate 30 which is bolted to a hub plate 32 welded to the axle 12.

The arrangement and configuration of parts hereto set forth comprise the subject matter of a co-pending application Ser. No. 410,702 filed Oct. 29, 1973 in the name of applicant now abandoned.

The actuators 28 include a cylinder housing 34 within which is slidably disposed a piston member 36. Typically, actuators of this type are hydraulically operated; therefore, threaded ports 38 are provided to receive suitable fluid line fittings (not shown) which communicate with the interior of the cylinder housing to supply fluid pressure thereto. The cylinder housing 34 and piston member 36 also include suitable seals, such as the boot seal 40 and the ring seal 42, to prevent escape of fluid from within.

It is apparent from the above that when fluid pressure is supplied, the piston member 36 is urged out of the cylinder housing 34, thereby forcing the friction element 22 into frictional engagement with the friction disc 14 creating a braking force. After repeated application of the braking force, the friction element 22 and specifically the friction pads 26 undergo wear. As wear continues, element 22 must travel farther into the V-shaped friction disc 14 to frictionally engage the surfaces thereof, as shown in the phantom section 42 of FIG. 2. To accommodate such wear, a wear take-up device is provided which maintains the piston member in operative proximity to the friction element 22.

The wear take-up device includes a stationary member comprising a shaft 44 supported within the cylinder housing 34. The shaft 44 is threaded at one end 46 thereof and extends through an aperture and the rear wall of the cylinder housing 34 so that it can be secured thereto by means of a nut 48. One directional gripping means comprising the circular member 50 are adapted to engage the exterior surface of the shaft 44 for permitting relative motion therebetween in only one direction. The gripping means includes a gripping portion 52 which is supported by a supporting portion 54. The gripping portion 52 is a flange extending inwardly from the supporting portion 54 at an oblique angle thereto so that it engages the surface of the shaft 44 at an angle. The flange may be in the form of a continuous collar surrounding the shaft 44 or it may be a plurality of separate prongs. In any event, the gripping portion 52 is adapted to grippingly engage the surface of the shaft 44 to prevent movement of the gripping means from right to left, as viewed in FIG. 2, but permits movement of the gripping means from left to right.

To prevent excessive residual engagement between the friction element 22 and friction disc 14, lost motion connection means are provided for connecting the gripping means to the piston member 36 to allow a predetermined amount of motion between the gripping means and the piston member 36. The lost motion connection means includes an annular channel 56 disposed about the interior surface of the piston member 36 for providing limited movement of the gripping means with respect thereto. In conjunction therewith, the supporting portion 54 is generally disc-shaped and includes a peripheral edge which is disposed within the annular channel 56 and having a thickness less than the width of the channel 56.

The support portion 54 of the gripping means is held within the annular channel 56 by a washer member 58. Washer member 58 forms one side of the channel 56 and also strengthens the supporting portion 54 of the gripping means.

It should also be noted that the gripping means includes apertures 60 for permitting the entry of fluid into the piston member 36.

A recess 62 extends axially into the piston 36 from the open rear end thereof to define a shoulder 64 facing the open end of the piston 36. A groove 66 is disposed in the piston in the recess 62 and in axially spaced relationship to the shoulder 64. The washer member 58 is a retaining ring taking the form of a snap ring which may be removed from the groove 66. The snap ring 58 defines a second shoulder axially spaced from the first shoulder 64 and the supporting portion or flange 54 of the gripping member is disposed in the channel 56 defined between the snap ring 58 and the first shoulder 64. The channel 56 is axially wider than the thickness of the support portion or flange 54 of the gripping member whereby the gripping member may move axially relative to the piston 36. The recess 62 is annular in that it extends circumferentially about the shaft-like member 44. In similar fashion, the groove 66 extends circumferentially about the interior of the hollow piston 36.

The threaded end portion 46 of the shaft-like member 44 and the threaded nut 48 define a connection means for removably connecting the shaft-like member 44 to the housing 34. The shaft-like member 44 has a radial shoulder engaging the interior surface of the housing 34 and extends through the housing to the exterior thereof where the nut 48 is readily accessible. The assembly may be easily disassembled by removing the nut 48 and, in turn, removing the piston 36 and shaft-like member 44 from the housing 34. Thereafter, the snapring 58 may be removed whereby the piston 36 may be removed from the shaft-like member as the support portion or flange 54 of the gripping member moves outwardly along the recess 62, as the recess 62 has a constant diameter from the open rear end of the piston 36 to the shoulder 64.

Figure 3:
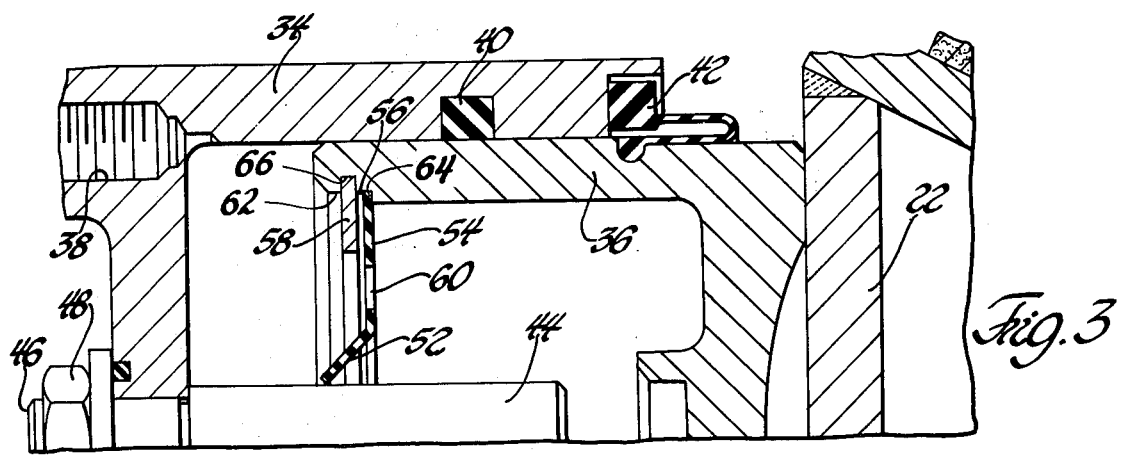
FIG. 3 is a partial view similar to FIG. 2 illustrating a moved position.

In operation, when fluid pressure is applied, the piston member 36 is moved to the right, as viewed in FIG. 2, to engage and urge the friction element 22 into frictional engagement with the friction disc 14. During the movement, the gripping means slides to the rear or left side of channel 56 against the washer 58 and moves to the right over the surface of the shaft 44. This movement is permitted because, due to the angle of contact, the gripping portion 52 is ineffective. The piston member 36 moves out of the cylindrical housing 36 a distance sufficient only to apply the braking force and to take up any wear. When the braking force is released the gripping means is prevented from moving from right to left due to the engagement of the gripping portion 52 with the shaft 44. The piston member 36, however, is able to retract a slight distance until the support portion 54 of the gripping means comes into contact with the right wall of channel 56, as shown in FIG. 3. Further movement of the piston member 36 to the left is thereby precluded so that it remains in operative proximity to the friction element 22. However, the piston member 36 has retracted a sufficient distance to alleviate any unwanted residual engagement between the friction element 22 and friction disc 14. Biasing means may be provided for positively urging the friction element 22 and the piston member 36 away from the friction disc 14, thereby ensuring that the piston member 36 will retract the predetermined distance allowed by the lost motion connection means. Such biasing means includes the support pins 68 which are secured to the support structure and extend through the member 24 of the brake pad with a pin 70 extending diametrically therethrough and a spring 72 disposed thereabout for urging the brake pad in a direction toward the actuating piston 36 whereby upon release of hydraulic pressure against the actuating piston 36 the friction pad or brake pad will be moved out of engagement with the brake disc 14.

The invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the instant invention in which an exclusive property or privilege is claimed are defined as follows:

1. A brake assembly comprising: support means; a friction element directly supported by said support means for movement into and out of frictional engagement with a friction disc to apply a braking force thereto; an actuator supported by said support means for moving said friction element into engagement with the friction disc; biasing means reacting between said supporting means and said friction element for moving said friction element out of engagement with the friction disc and against said actuator; said actuator including a housing defining a cavity, a hollow piston member slidably supported in said cavity of said housing and having a front end engageable with said friction element, said piston member being open from the rear end thereof, a shaft-like member supported by said housing and extending into said cavity and into said open rear end of said piston member to a distal end thereof, said piston member having a recess on the interior thereof and extending about the axis of said shaft-like member to define a first shoulder facing said open rear end, said recess extending axially from said first shoulder to said rear end of said piston member, integral gripping means including a conical gripping portion in gripping engagement with said shaft-like member for moving along said shaft-like member only in the direction toward said distal end of said shaft-like member and a disc-like support portion extending radially of said gripping portion and into said recess for movement axially toward and away from said first shoulder, said piston member having a groove on the interior thereof extending about the axis of said shaft-like member, said groove being disposed in said recess and axially spaced from said first shoulder in the direction of said rear end, retaining means disposed in said groove and defining a second shoulder axially spaced from said first shoulder to define a channel between said shoulders, said retaining means being annular with an inner opening surrounding and disposed radially outwardly of said conical gripping portion, said disc-like support portion of said gripping means being disposed in said channel between said first and second shoulders, the distance between said shoulders being greater than the thickness of said disc-like support portion whereby said gripping portion may move along said shaft-like member toward said friction element to compensate for wear of said friction element and whereby said disc-like support portion of said gripping means is allowed to move axially between said shoulders to allow said piston to retract to allow said biasing means to move said friction element out of engagement with said friction disc.

2. An assembly as set forth in claim 1 including removable connection means for removably connecting said shaft-like member to said housing.

3. An assembly as set forth in claim 2 wherein said shaft-like member extends through said housing to the exterior thereof.

4. An assembly as set forth in claim 3 wherein said connection means is disposed on the exterior of said housing.

5. An assembly as set forth in claim 4 wherein said connection means includes a threaded end portion on said shaft-like member and a threaded nut engaging said end portion.

* * * * *